United States Patent
Narumi et al.

(10) Patent No.: US 8,018,189 B2
(45) Date of Patent: Sep. 13, 2011

(54) MOTOR DRIVE APPARATUS

(75) Inventors: Satoshi Narumi, Itami (JP); Masaaki Kato, Itami (JP); Masaharu Hoashi, Itami (JP); Toshiya Suzuki, Itami (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 453 days.

(21) Appl. No.: 12/334,284

(22) Filed: Dec. 12, 2008

(65) Prior Publication Data
US 2009/0153086 A1 Jun. 18, 2009

(30) Foreign Application Priority Data
Dec. 14, 2007 (JP) ................... 2007-322761

(51) Int. Cl.
*H02P 7/00* (2006.01)
*H02P 6/16* (2006.01)

(52) U.S. Cl. ............... 318/400.35; 318/459; 318/400.34; 318/437; 318/823; 318/799; 318/257; 361/236; 361/237; 361/238; 361/240; 361/244; 324/160; 324/163; 324/161; 324/166

(58) Field of Classification Search ............. 318/400.35, 318/400.34, 459, 437, 823, 314, 799, 257, 318/254.1, 700
See application file for complete search history.

(56) References Cited

U.S. PATENT DOCUMENTS

| | | | | |
|---|---|---|---|---|
| 5,592,058 | A * | 1/1997 | Archer et al. | 318/400.09 |
| 5,633,895 | A * | 5/1997 | Powell et al. | 375/324 |
| 6,181,093 | B1 * | 1/2001 | Park et al. | 318/400.34 |
| 6,806,663 | B2 * | 10/2004 | Kusaka et al. | 318/400.17 |
| 7,102,312 | B2 * | 9/2006 | Suzuki et al. | 318/400.05 |
| 7,106,013 | B2 * | 9/2006 | Narumi et al. | 318/400.25 |
| 7,166,975 | B2 * | 1/2007 | Mori et al. | 318/400.36 |
| 7,298,106 | B2 * | 11/2007 | Yamamoto et al. | 318/400.27 |
| 7,342,378 | B2 * | 3/2008 | Sakamoto et al. | 318/717 |
| 7,535,188 | B2 * | 5/2009 | Fukamizu et al. | 318/254.1 |
| 7,667,419 | B2 * | 2/2010 | Fukamizu et al. | 318/400.34 |
| 7,723,937 | B2 * | 5/2010 | Kurosawa et al. | 318/400.34 |
| 7,768,226 | B2 * | 8/2010 | Fukamizu et al. | 318/700 |

FOREIGN PATENT DOCUMENTS
JP 2006-217681 A 8/2006

* cited by examiner

*Primary Examiner* — Rita Leykin
(74) *Attorney, Agent, or Firm* — Miles & Stockbridge P.C.

(57) ABSTRACT

The present invention provides a motor drive apparatus which improves a trade-off relation between a stable position detection and noise at its driving. A sensorless drive operation circuit calculates by operation a zero cross point (point p) of a voltage of a position detection phase at the next interval, using time information measured based on an output signal from a comparison circuit at the previous interval and the present interval. After the point p has been calculated, points a and b are detected by interrupting a predetermined time drive current.

7 Claims, 13 Drawing Sheets

US 8,018,189 B2

MOTOR DRIVE APPARATUS

CROSS-REFERENCE TO RELATED APPLICATIONS

The disclosure of Japanese Patent Application No. 2007-322761 filed on Dec. 14, 2007 including the specification, drawings and abstract is incorporated herein by reference in its entirety.

BACKGROUND OF THE INVENTION

The present invention relates to a motor drive apparatus, and particularly to a motor drive apparatus which drives a 3-phase brushless motor without using a Hall sensor.

There has heretofore been known a motor drive apparatus which drives a 3-phase brushless motor without using a Hall sensor. In the motor drive apparatus, the position of rotation of a rotor is detected using back electromotive forces (B-EMF) generated in coils of a stator by the rotation of the rotor instead of the detection of the rotational position of the rotor by the Hall sensor. Based on the result of detection, 3-phase PWM voltages 120° out of phase with one another are applied to 3-phase coils.

As one example of such a motor drive apparatus, there is cited a configuration disclosed in a patent document 1 (Japanese Unexamined Patent Publication No. 2006-217681 (FIGS. 1 and 2)). Although such a configuration that the position of rotation of a rotor is detected by detecting a zero cross point of each drive voltage has been disclosed in the patent document 1, there is a need to temporarily interrupt a drive current of a position detection phase at a predetermined timing for the purpose of the above. A problem, however, arises in that the interruption of the drive current results in the occurrence of motor's torque ripples and noise at motor driving.

An interruption time of each drive current is determined depending on to which extent it is caused to adapt or correspond to variations between motor' phases and sudden acceleration of the motor. As the range in which it is caused to adapt thereto, becomes wider, the interruption time increases and noise becomes large. Therefore, a stable position detection and noise at motor's driving were placed in a trade-off relationship.

In recent markets, however, there has been a demand for provision of a motor drive apparatus which performs driving that reduces noise in Hall sensorless form. There has been a demand to improve the trade-off relationship between the stable position detection and the noise at the motor driving.

SUMMARY OF THE INVENTION

In the conventional motor drive apparatus described above, the supply of the drive current to each coil of the position detection phase is interrupted at the predetermined timing preceding the detection of the zero cross point. Therefore, if the predetermined timing is set in such a manner that the interruption period becomes long, it is then possible to adapt to the variations between the motor's phases and the sudden acceleration. However, the waveform of the motor's drive current is distorted and noise becomes large.

A problem arises in that when the current is interrupted immediately before the zero cross point to reduce the distortion of the drive current in reverse, this cannot follow the variations between the motor's phases and the acceleration and the zero cross point cannot be detected, so that it is not possible to cause each drive current to flow at a proper timing without any ability to perform the position detection, and to rotate the motor normally.

The present invention has been made to solve the above problems. It is therefore an object of the present invention to provide a motor drive apparatus which improves a trade-off relationship between a stable position detection and noise at its driving.

In one embodiment according to the present invention, a zero cross point (point p) of a voltage of a position detection phase at the next interval is calculated by operation using time information measured based on an output signal from a comparison circuit at the previous interval and the present interval. After the point p has been calculated, points a and b are detected by interrupting a predetermined time drive current.

According to the above embodiment, an interruption period of each drive current can be reduced greatly as compared with a conventional method in which the current is interrupted from before an electrical angle of 26.25° prior to the detection of a point p and the current is interrupted even after the detection of the point p. Since it is not necessary to interrupt the drive current over a long period of time, it is possible to perform a stable position detection and reduce noise caused by distortion of each waveform with the interruption of the drive current.

DETAILED DESCRIPTION OF THE PREFERRED EMBODIMENTS

Embodiments

A. Apparatus Configuration

A-1. Overall Configuration

Figure 1:
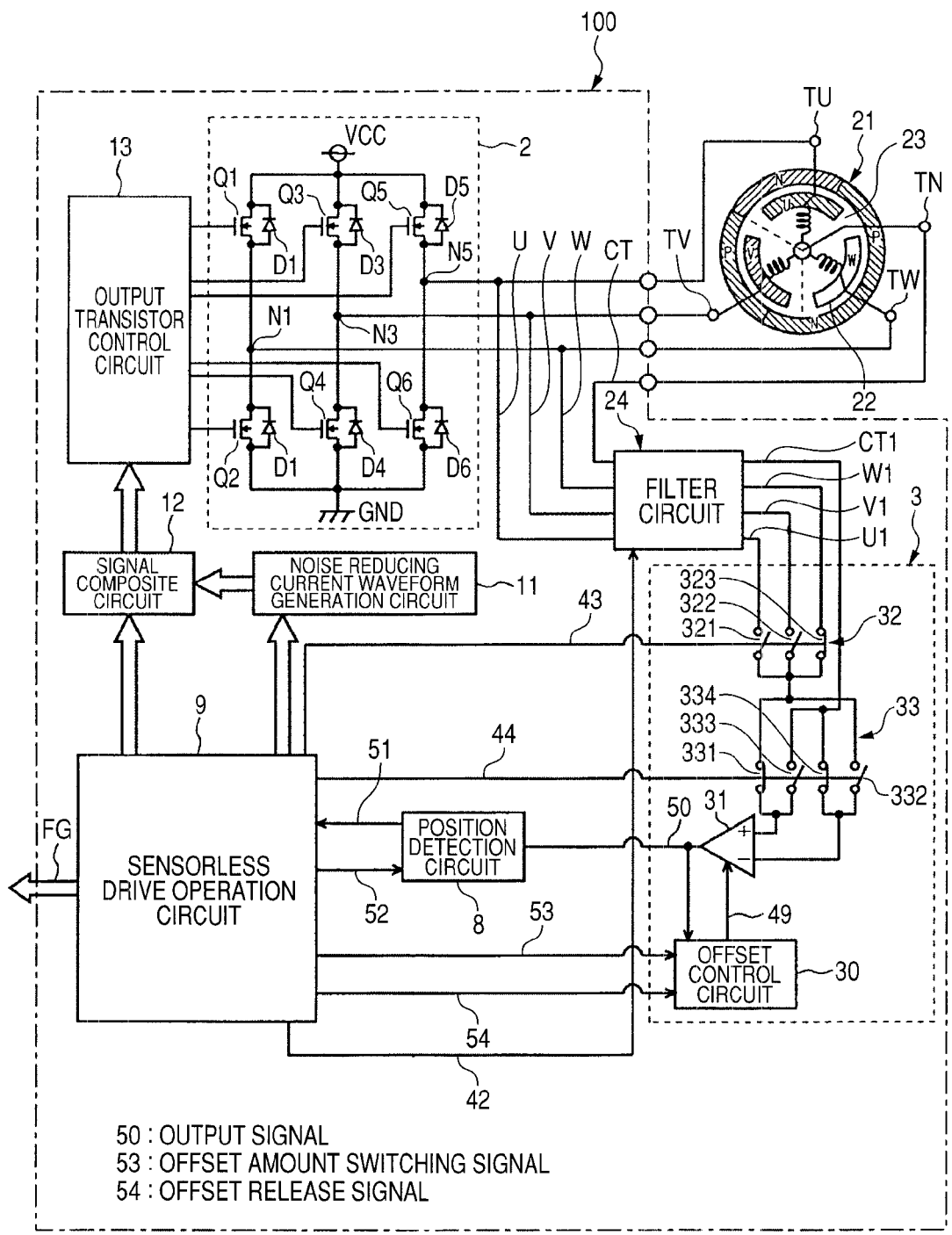
FIG. 1 is a block diagram showing a configuration of a motor drive apparatus illustrative of an embodiment according to the present invention.

FIG. 1 is a block diagram showing a configuration of a motor drive apparatus 100 illustrative of an embodiment according to the present invention. As shown in FIG. 1, the motor drive apparatus 100 includes an output circuit 2, a filter circuit 24, a comparison circuit 3 (voltage comparison unit), a position detection circuit 8, a sensorless drive operation circuit 9 (drive operation unit), a noise reducing current waveform generation circuit 11, a signal composite circuit 12 and an output transistor control circuit 13. The motor drive apparatus 100 drives a 3-phase brushless motor 21 without using a Hall sensor. Incidentally, the motor drive apparatus 100 is formed as one IC (Integrated Circuit).

The 3-phase brushless motor 21 has a stator 22 and a rotor 23 rotatably provided therearound. The stator 22 includes Y-coupled coils of an U-phase, a V-phase and a W-phase. One ends of the coils of the U-phase, the V-phase and the W-phase are coupled to coil terminals TU, TV and TW of the U-phase, the V-phase and the W-phase, and the other ends thereof are coupled to a neutral point terminal TN. In the rotor 23, a plurality of N-poles and a plurality of P-poles (four poles in the figure) are alternately placed along the direction of rotation.

When the 3-phase PWM voltages 120° out of phase with each other are applied to the coils of the U-phase, the V-phase and the W-phase in such a 3-phase brushless motor 21, respectively, a revolting field is produced to rotate the rotor 23 in accordance with the revolving field. Incidentally, the 3-phase brushless motor 21 is used as, for example, a spindle motor which rapidly rotates a DVD (digital versatile disc) of a personal computer and a CD (compact disc).

Respective configurations will next be explained. The output circuit 2 includes MOS transistors Q1 through Q6 and diodes D1 through D6. The MOS transistors Q1 and Q2, Q3 and Q4 and Q5 and Q6 are coupled in series between lines of a power-supply voltage (VCC) and lines of a ground voltage (GND) with N channel MOS transistors and P channel MOS transistors as pairs, respectively.

A node N1 between the MOS transistors Q1 and Q2, a node N3 between the MOS transistors Q3 and Q4 and a node N5 between the MOS transistors Q5 and Q6 are coupled to the coil terminals TU, TV and TW of the 3-phase brushless motor 21, respectively.

The diodes D1, D3 and D5 are coupled between the nodes N1, N3 and N5 and the lines of power-supply voltage VCC in such a manner that they are coupled in reverse parallel to the MOS transistors Q1, Q3 and Q5, respectively. The diodes D2, D4 and D6 are coupled between the lines of ground voltage GND and the nodes N1, N3 and N5 in such a manner that they are coupled in reverse parallel to the MOS transistors Q2, Q4 and Q6, respectively. Incidentally, parasitic diodes parasitic on the respective MOS transistors may be used instead of the diodes D1 through D6.

The MOS transistors Q1 through Q6 are turned on/off at a predetermined timing to allow the direct-current voltage VCC to be converted to the 3-phase PWM voltages.

The filter circuit 24 is coupled to the coil terminals TU, TV and TW of the 3-phase brushless motor 21 and the neutral point terminal TN. The filter circuit 24 eliminates voltage components caused by current ripples contained in back electromotive voltages U, V and W (coil terminal voltages) respectively outputted from the coil terminals TU, TV and TW, and a neutral point voltage CT and outputs them as post-filtering back electromotive voltages U1, V1 and W1 and a post-filtering neutral point voltage CT1.

Namely, although there is a possibility that in the 3-three brushless motor 21, the stator 22 whose windings have flaws such as pinholes changes in inductance component and the balance between the back electromotive voltages (B-EMF) generated in the respective phases with a CT reference may be lost, B-EMF kept in a state free of the pinholes or the like can be detected by integrating the coil terminal voltages of the 3-three brushless motor 21 through a CR filter.

The comparison circuit 3 has a comparator 31, an offset control circuit 30 for controlling the setting of an offset of the comparator 31, a polarity switching unit 33 coupled to a + terminal and a − terminal of the comparator 31 and a signal switching unit 32 for alternately switching the back electromotive voltages U, V and W or the post-filtering back electromotive voltages U1, V1 and W1 thereby to supply one of them to the polarity switching unit 33.

The signal switching unit 32 has a switch 321 which receives the back electromotive voltage U or the post-filtering back electromotive voltage U1, a switch 322 which accepts the back electromotive voltage V or the post-filtering back electromotive voltage V1 and a switch 323 which receives the back electromotive voltage W or the post-filtering back electromotive voltage W1. These switches are controlled in such a manner that only any one of them is turned on by a position detection phase selection signal 43 supplied from the sensorless drive operation circuit 9 to be described later.

The polarity switching unit 33 includes switches 331 and 332 for supplying the signal selected by the signal switching unit 32 to the + or − terminal of the comparator 31 by switching, and switches 333 and 334 for supplying the neutral point voltage CT or the post-filtering neutral point voltage CT1 to the + or − terminal of the comparator 31 by switching. The switches 331 and 333 are coupled to the + terminal of the comparator 31, and the switches 332 and 334 are coupled to the − terminal of the comparator 31. The pair of switches 332 and 333 and the pair of switches 331 and 334 are controlled so as to operate complementarily by a polarity exchange signal 44 supplied from the sensorless drive operation circuit 9.

The comparator 31 performs a comparison between any of the back electromotive voltages U, V and W and the neutral point voltage CT or a comparison between any of the post-filtering back electromotive voltages U1, V1 and W1 and the post-filtering neutral point voltage CT1. When, for example, the post-filtering back electromotive voltage U1 becomes higher than the post-filtering neutral point voltage CT1, an output signal 50 of the comparator 31 becomes a high potential ("H") level. When the post-filtering back electromotive voltage U1 is lower than the post-filtering neutral point voltage CT1, the output signal 50 becomes a low potential ("L") level.

Incidentally, when the back electromotive voltages U1, V1 and W1 are supplied to one terminal of the comparator 31 by the polarity switching unit 33, for example, the output signal 50 of the comparator 31 becomes the "H" level if the post-filtering back electromotive voltage U1 is lower than the post-filtering neutral point voltage CT1, and the output signal 50 thereof becomes the "L" level if the post-filtering back electromotive voltage U1 is higher than the post-filtering neutral point voltage CT1.

The position detection circuit 8 receives the output signal 50 of the comparator 31, applies a mask to the output signal 50 based on a mask signal 52 supplied from the sensorless drive operation circuit 9 and supplies the same to the sensorless drive operation circuit 9 as a position detection signal 51.

The sensorless drive operation circuit 9 generates a PWM signal based on the position detection signal from the position detection circuit 8 and controls the PWM signal to interrupt the current of the position detection phase at an optimum timing.

While the sensorless drive operation circuit 9 generates a pulse-like revolving or rotational signal FG based on the position detection signal from the position detection circuit 8 and outputs it to the outside of a system, the sensorless drive operation circuit 9 switches the logic of the polarity exchange signal 44 each time the edge of the revolving signal FG is detected, thereby to switch the polarity of the comparator 31 and sequentially switches or changes over the switches 321 through 323 of the signal switching unit 32 at a timing subsequent to the detection of the edge of the revolving signal FG.

The noise reducing current waveform generation circuit 11 is synchronized with the PWM signal generated in the sensorless drive operation circuit 9 to generate a current waveform for reducing noise of the 3-phase brushless motor 21.

The signal composite circuit 12 combines the PWM signal generated in the sensorless drive operation circuit 9 and the current waveform generated in the noise reducing current waveform generating circuit 11.

The output transistor control circuit 13 on/off-controls each of the transistors Q1 through Q6 of the output circuit 2 in accordance with the output signal of the signal composite circuit 12. Thus, 3-phase PWM voltages are supplied from the output circuit 2 to the 3-phase brushless motor 21 to rotate the rotor 23.

A-2. Configuration of Filter Circuit

Figure 2:
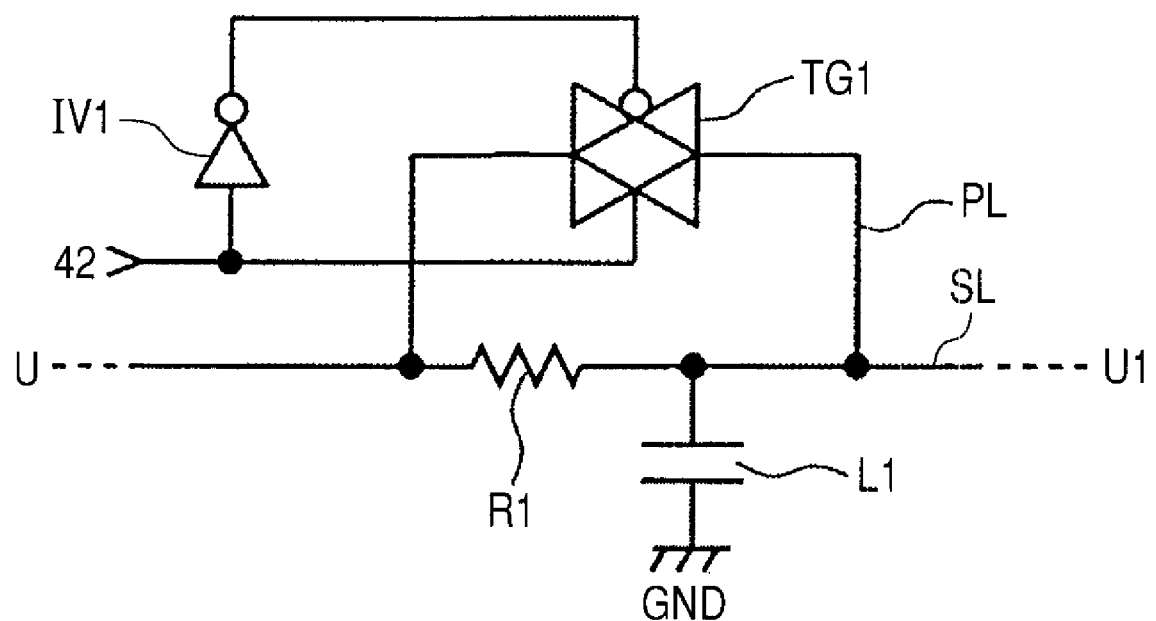
FIG. 2 is a diagram illustrating a configuration of a filter circuit.

The configuration of the filter circuit 24 will next be explained using FIG. 2. As shown in FIG. 2, the filter circuit 24 comprises low-pass filters each comprised of a CR filter including a resistive element R1 interposed in a signal line SL and a capacitive element L1 interposed between the signal line SL and GND, and transmission gates TG1 each interposed in a bypass line PL for bypassing the low-pass filter, both of which are provided in respective signal lines. Incidentally, the low-pass filter provided in the U-phase signal line and the transmission gate TG1 are illustrated in FIG. 2.

An inversion gate of the transmission gate TG1 is supplied with an inverted signal of the control signal 42 via an inverter IV1, and the gate of the transmission gate TG1 is supplied with the control signal 42. When the transmission gate TG1 is brought to an on state by the control signal 42, a signal of the signal line SL passes through the bypass line PL and the low-pass filter is substantially brought to an off state. Here, the control signal 42 is of a signal supplied from the sensorless drive operation circuit 9 to be described later.

Incidentally, an N channel type MOS transistor or a P channel type MOS transistor may be used in the bypass line PL in place of the transmission gate TG1. When, however, the transmission gate is used, there is an advantage that an input range can be enlarged.

Although there is shown above the example in which the filter circuit 24 is configured by the CR filter, the filter circuit is not limited to the CR filter if such a low-pass filter as to be capable of eliminating harmonic components is adopted.

A-3. Configuration of Sensorless Drive Operation Circuit

Although the basic configuration of the sensorless drive operation circuit 9 is as mentioned above, a configuration of a portion related to the present invention will be further explained below using FIG. 3.

The sensorless drive operation circuit 9 has a detection determination circuit 91 which accepts the position detection signal 51 supplied from the position detection circuit 8 and which makes detection signals 61, 62 and 63 significant in response to detections (or calculations) of a point a (first detection point), a point b (second detection point) and a point p (zero cross point) respectively and outputs the same therefrom. In order to perform the detection of the points a and b, the detection determination circuit 91 supplies an offset amount switching signal 53 for switching an offset amount to the offset control circuit 30 of the comparison circuit 3 and makes an offset release signal 54 significant (brings it to "L" in this case) after the end of detection of the point b, followed by supply to the offset control circuit 30.

The detection signal 61 of the point a is supplied to a subcounter 92, the detection signal 62 of the point b is supplied to the subcounter 92 and an SC counter 93 (first counter), and the detection signal 63 of the point p is supplied to an MC counter 95 (second counter).

The SC counter 93 starts counting based on an unillustrated clock signal in response to the significance of the detection signal 62 of the point b and outputs the result of count to an adder 98.

The subcounter 92 starts counting based on the unillustrated clock signal in response to the significance of the detection signal 61 of the point a and continues counting until the detection signal 62 of the point b becomes significant, thereby measuring a counted number (time) between the points a and b. Information about the time is supplied to a subtracter 99 and a submemory 94.

The information about the previously-measured time from the points a to b has been stored in the submemory 94. When new time information from the points a and b is inputted, the previous time information is outputted to the subtracter 99.

The MC counter 95 starts counting based on the unillustrated clock signal in response to the significance of the detection signal 63 of the point p and then measures a period or interval taken until the detection signal 63 of the point p becomes significant. Incidentally, this operation corresponds to the operation where the detection of the point p is executed by a conventional technique. Since the offset amount switching signal 53 becomes significant where the p-point detection in the present invention is conducted, the result of operation by the adder 98 and the subtracter 99 is supplied to the MC counter 95, where the detected position of next point p is predicted from the result of operation.

The result of measurement or prediction by the MC counter 95 is stored in an MM memory 96. Next, when the detected position of point p is predicted, it is used as the length of an interval corresponding to the previous electrical angle of 60°.

Information about the length of the interval corresponding to the previous electrical angle of 60°, which has been stored in the MM memory 96, is supplied to a mask circuit 97 along with the result of measurement or prediction by the MC counter 95, where it is used for the generation of the mask signal 52.

With the adoption of such a configuration, a zero cross point (point p) corresponding to a voltage of a position detection phase at the next interval is calculated by operation using time information measured based on an output signal from the comparison circuit during the previous interval and the present interval.

A-4. Configuration of Comparison Circuit

One example illustrative of the configurations of the offset control circuit 30 and the comparator 31 in the comparison circuit 3 will next be explained using FIG. 4.

The offset control circuit 30 is of a circuit configured in such a manner that the comparator 31 has an offset by pulling current of one amplifier of a differential amplifier that configures an input stage of the comparator 31. Changing the magnitude of the pull-up current (offset control current 49) makes it possible to adjust an offset amount.

The comparator 31 has a P channel type MOS transistor T1 used as a + terminal (non-inversion input terminal) of the differential amplifier, a P channel type MOS transistor T3 used as a − terminal (inverse input terminal) thereof, an N channel type MOS transistor T2 coupled between the MOS transistor T1 and a ground (GND) line and an N channel type MOS transistor T4 coupled between the MOS transistor T3 and ground. The gates of the MOS transistors T2 and T4 are coupled in common to the drain of the MOS transistor T4.

The sources of the MOS transistors T1 and T3 are respectively coupled in common to a current source CS via resistors R4 and R5.

Coupling nodes of the MOS transistors T1 and T2 are coupled to the gate of an N channel type MOS transistor T6 of which the drain is coupled to the current source CS, and the source of the MOS transistor T6 is grounded.

An N channel type MOS transistor T5 is inserted between the drain of the MOS transistor T6 and the coupling nodes of the MOS transistors T1 and T2. The gate of the MOS transistor T5 is coupled to the drain thereof, and the back gate of the MOS transistor T5 is grounded.

The drain of the MOS transistor T6 functions as an output node. Inverters G1 and G2 are coupled in series to the output node, and the output of the inverter G2 becomes an output signal 50 of the comparator 31.

The offset control circuit 30 has a current discharge circuit for pulling up the current of one amplifier in the differential amplifier that configures the comparator 31.

The current discharge circuit has an N channel type MOS transistor T11 of which the drain is coupled between the resistor R4 of the comparator 31 and the source of the MOS transistor T1, a switch SW1 and resistors R1 and R2 coupled in series between the source of the MOS transistor T11 and ground in order, a switch SW2 inserted in a path that bypasses the resistor R2, and an amplifier A1 whose output is coupled to the gate of the MOS transistor T11.

A − terminal of the amplifier A1 is coupled to the source of the MOS transistor T11, and a + terminal of the amplifier A1 is coupled to a voltage supply circuit.

The voltage supply circuit has a capacitor C1 that stores a power-supply voltage (VCC) therein, a resistor R3 coupled in parallel to the capacitor C1, a switch SW3 which turns on and off the supply of the power-supply voltage to the capacitor C1, and a switch SW4 which opens and closes a coupling path of the resistor R3 and the capacitor C1. When the switch SW3 is turned on, the power-supply voltage is supplied to the + terminal of the amplifier A1. When the switch SW3 is turned off, a voltage corresponding to an electrical charge stored in the capacitor C1 is supplied thereto.

Incidentally, signals for on/off-controlling the switches SW1 through SW3 are generated by flip-flops F0 and F1.

Namely, the flip-flop F0 has a D input supplied with the power-supply voltage, a clock input supplied with the offset amount switching signal 53, an inverse reset input supplied with the offset release signal 54, a Q output used to on/off-control the switch SW3 and an inverse Q output used to on/off-control the switch SW1.

The flip-flop F1 has a D input supplied with the power-supply voltage, an inverse reset input supplied with the Q output of the flip-flop F0 and a clock input supplied with the output of an AND circuit G11 which performs an AND operation on the output signal 50 of the comparator 31 and the Q output of the flip-flop F0. A Q output of the flip-flop F1 is used to on/off-control the switches SW2 and SW4.

Incidentally, the switches SW1, SW3 and SW4 are of switches turned off when the on/off control signals are respectively brought to an "H" level. The switch SW2 is of a switch turned on when the on/off control signal is brought to the "H" level.

With the adoption of such a configuration, it is possible to cause the current proportional to the voltage on the + terminal side of the amplifier A1 to flow through the MOS transistor T11. As a result, the current flowing through the resistor R4 of the comparator 31 can be defined or prescribed by the resistors R1 and R2.

More specifically, the current flows via the resistors R1 and R2 where the switch SW1 is turned on and the switch SW2 is turned off. If the resistance values of the two are the same R, then the current flows via the resistors of 2×R. Therefore, the current flowing through the resistor R4 of the comparator 31 becomes relatively small. When the current flowing through the resistor R4 is small, the amount of offset of the comparator 31 is also small.

On the other hand, when the switches SW1 and SW2 are turned on, the current flows via the resistor R1. Thus, since the current flows via the resistance value R, the current flowing through the resistor R4 of the comparator 31 becomes twice the current that flows through the resistors R1 and R2. If the current flowing through the resistor R4 reaches twice, then the offset amount of the comparator 31 also becomes twice.

When the current is flowing via the resistors R1 and R2, although the offset amount of the comparator 31 can be controlled by the resistance values of the resistors R1 and R2 in this way, the switch SW4 is brought to an on state to attenuate the voltage of the + terminal of the amplifier A1 by the time constant of the resistor R3 and the capacitor C1 and also attenuate the current flowing through the resistor R4 correspondingly, thereby attenuating the offset amount too. On the other hand, when the switch SW4 is brought to an off state where the current is flowing via the resistor R1, the voltage of the + terminal of the amplifier A1 is maintained at a voltage corresponding to the electrical charge stored in the capacitor C1. Therefore, the current flowing through the resistor R4 is also kept constant and the offset amount is also held constant.

A-5. Configuration of Position Detection Circuit

Figure 5:
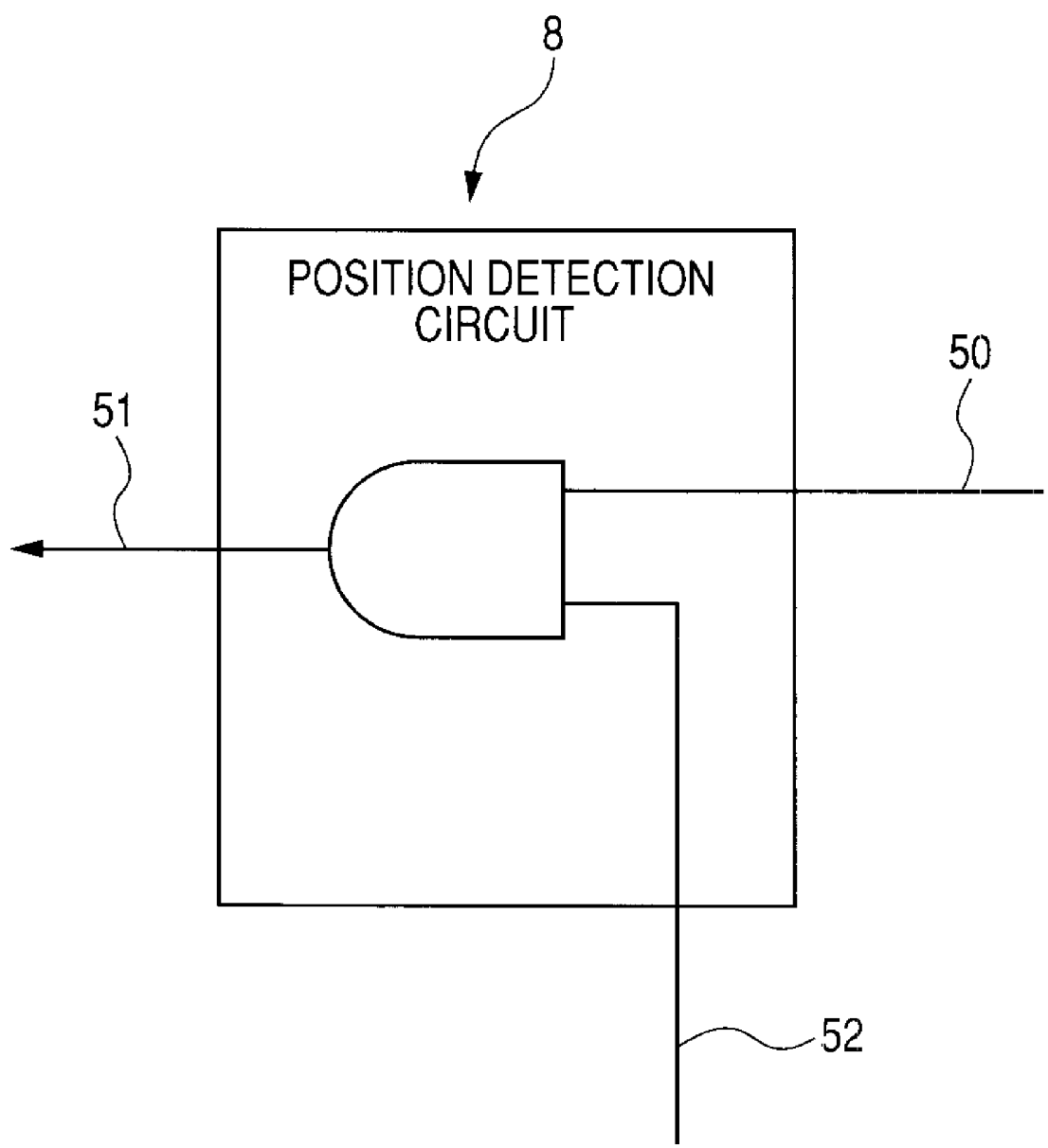
FIG. 5 is a diagram illustrating a configuration of a position detecting circuit.

One example of a configuration of the position detection circuit 8 will next be explained using FIG. 5. As shown in FIG. 5, the position detection circuit 8 has an AND circuit 81 that performs an AND operation on the output signal 50 of the comparator 31 and the mask signal 52. The output of the AND circuit 81 is outputted as the position detection signal 51.

Incidentally, the position detection circuit 8 has an edge detection circuit for detecting the rising edge of the output signal 50, which is provided in a stage prior to the AND circuit 81. When the rising edge of the output signal 50 varies, such a configuration that the first riding edge is detected to determine the edge may be adopted.

B. Apparatus Operation

Figure 6:
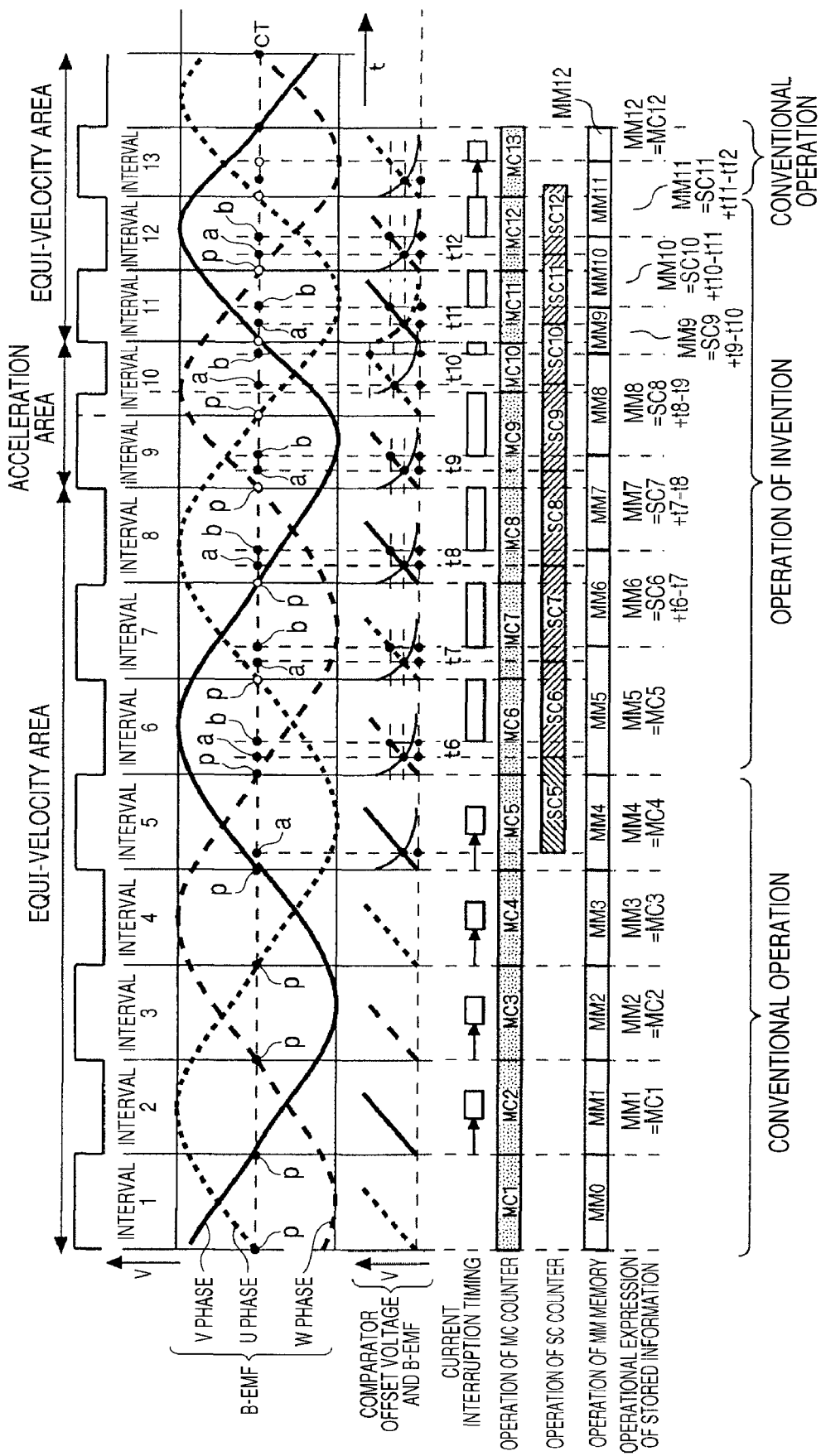
FIG. 6 is a diagram for typically describing a silencing operation of the motor drive apparatus according to the present invention.
Figure 7:
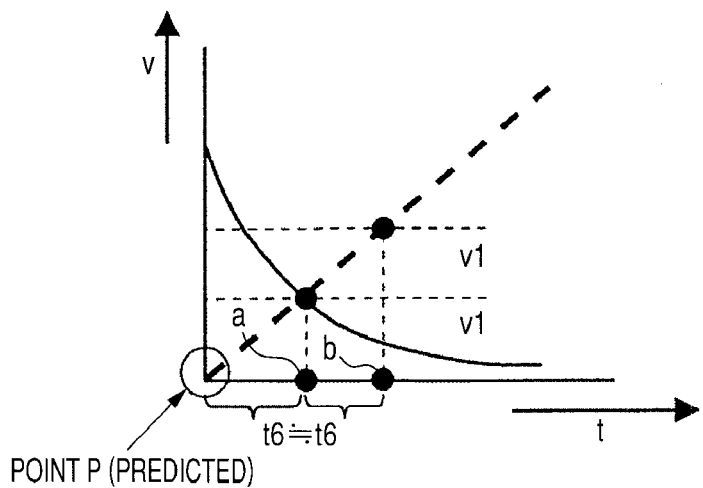
FIG. 7 is a diagram showing the relationship between an offset voltage and a B-EMF waveform.

The operation of the motor drive apparatus 100 will next be explained using FIGS. 6 through 12. FIG. 6 is a typical diagram showing a silencing operation of the motor drive apparatus 100. FIG. 6 shows an extracted diagram showing a relationship between waveforms (B-EMF waveforms) of post-filtering back electromotive voltages U1, V1 and W1, revolving signals FG corresponding to the waveforms, an offset voltage of the comparator 31 and B-EMF waveforms, a typical diagram showing current interruption timings, a typical diagram showing the operation of the MC counter 95, a typical diagram showing the operation of the SC counter 93, a typical diagram showing the operation of the MM memory 96, and operational expressions for the information stored in the MM memory 96. FIG. 7 shows an extracted diagram showing the relationship between an offset voltage and a B-EMF waveform as an enlarged diagram.

Figure 9:
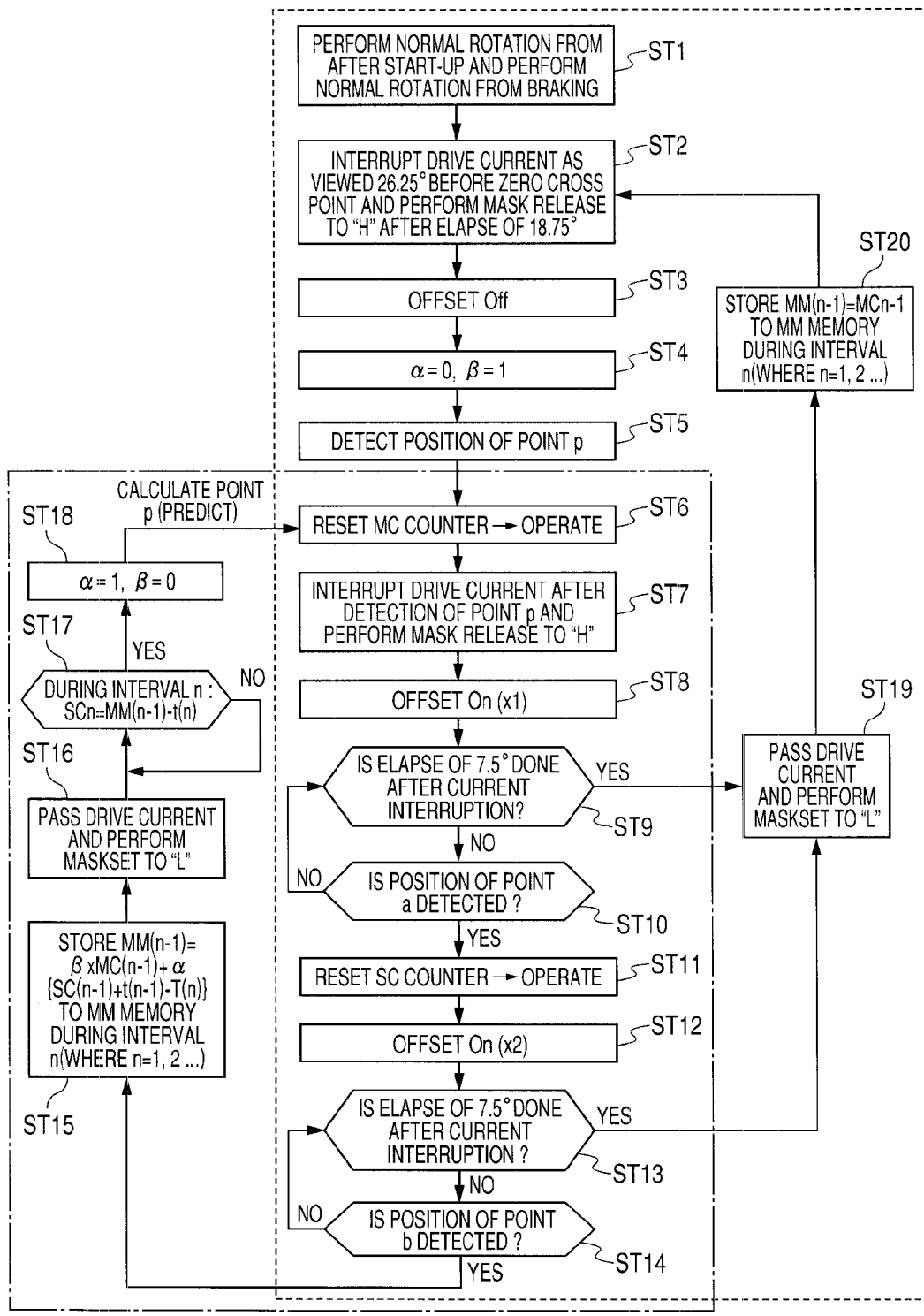
FIG. 9 is a flowchart for describing the operation of calculating a zero cross point at the motor drive apparatus according to the present invention.

In the revolving signals FG outputted from the sensorless drive operation circuit 9, the edges are set corresponding to zero cross points (points p) as shown in FIG. 9. However, the revolving signals FG have heretofore interrupted the supply of drive currents to the coils of position detection phases prior to the detection of the zero cross point. This is because unless the supply thereof is done, B-EMF voltages cannot be detected due to kickback currents based on the drive currents.

According to this method, while distortion occurs in the waveform of the drive current of the motor, an interruption period or interval may be short if the motor is merely associated with the equi-velocity revolution, and noise caused by the distortion of the waveform of the drive current is also relatively low. However, in order to cope with the case where the motor is accelerated from the equi-velocity revolution, the interruption period must be set long in advance and noise has been increased.

The operation of the motor drive apparatus 100 will be explained below using flowcharts shown in FIGS. 8 and 9 with reference to FIGS. 6 and 7.

Assume that the motor 21 (FIG. 1) is in a state of being rotated at an equi-velocity. One section or interval (equivalent to an electrical angle of 60°) is defined between a zero cross point of each drive voltage and a zero cross point thereof. An equi-velocity area is set between intervals 1 and 8 and between intervals 11 and 13, and an acceleration area is set between intervals 9 and 10, respectively.

B-1. Detecting Operations at Intervals 3 and 4

In order to make clear a difference from the present invention, the operation of detecting each zero cross point by a conventional method in the motor drive apparatus 100 will first be explained using the flowchart shown in FIG. 8, taking the intervals 3 and 4 lying in the equi-velocity area as an example. In Step ST31 of FIG. 8, the motor 21 is normally rotated after its start-up or from a braked state.

Upon the conventional operation, a drive current is interrupted prior to position detection. Namely, a strip-like area corresponds to a period during which the drive current is being passed in the typical diagram showing the current interruption timings of FIG. 6. In Step ST32, in order to detect the next zero cross point, i.e., a zero cross point (point p) at the interval 3, the sensorless drive operation circuit 9 interrupts the drive current when the drive current is located before 26.25° as the electrical angle of a predicted zero cross point during the interval 2. In Step ST32, the mask signal 52 (FIG. 1) is released when an electrical angle of 18.75° has elapsed after the interruption of the drive current (it is brought to an "H" level in this case). Incidentally, when the mask signal 52 is released, the drive current is located 7.5° before the point p at the interval 3.

Next, in Step ST33, the sensorless drive operation circuit 9 makes the offset release signal 54 significant (brings it to "L" in this case) and supplies it to the offset control circuit 30. This corresponds to the operation for releasing an offset of the comparator 31. When the offset release signal 54 becomes significant, the inverse Q output of the flip-flop F0 in the offset control circuit 30 (FIG. 4) is brought to an "H" level so that the switch SW1 is brought to an off state. Thus, the pulling of the current from the comparator 31 is stopped to release the offset.

Next, in Step ST34, α and β corresponding to coefficients used in an operational expression (described in detail later) used to predict the detected position of point p are set to 0 and 1 respectively.

Next, in Step ST35, the detection of each point p at the interval 3 is performed by the comparator 31 during the period at which the drive current is being interrupted. That is, the comparator 31 performs a comparison between each of the post-filtering B-EMF (U1, V1 and W1) of phases and the neutral point voltage CT1. When the B-EMF becomes higher than the neutral point voltage CT1 (when the B-EMF becomes lower than it where the polarity of each waveform is reversed), the output signal 50 of the comparator 31 is outputted as an "H" level.

Figure 4:
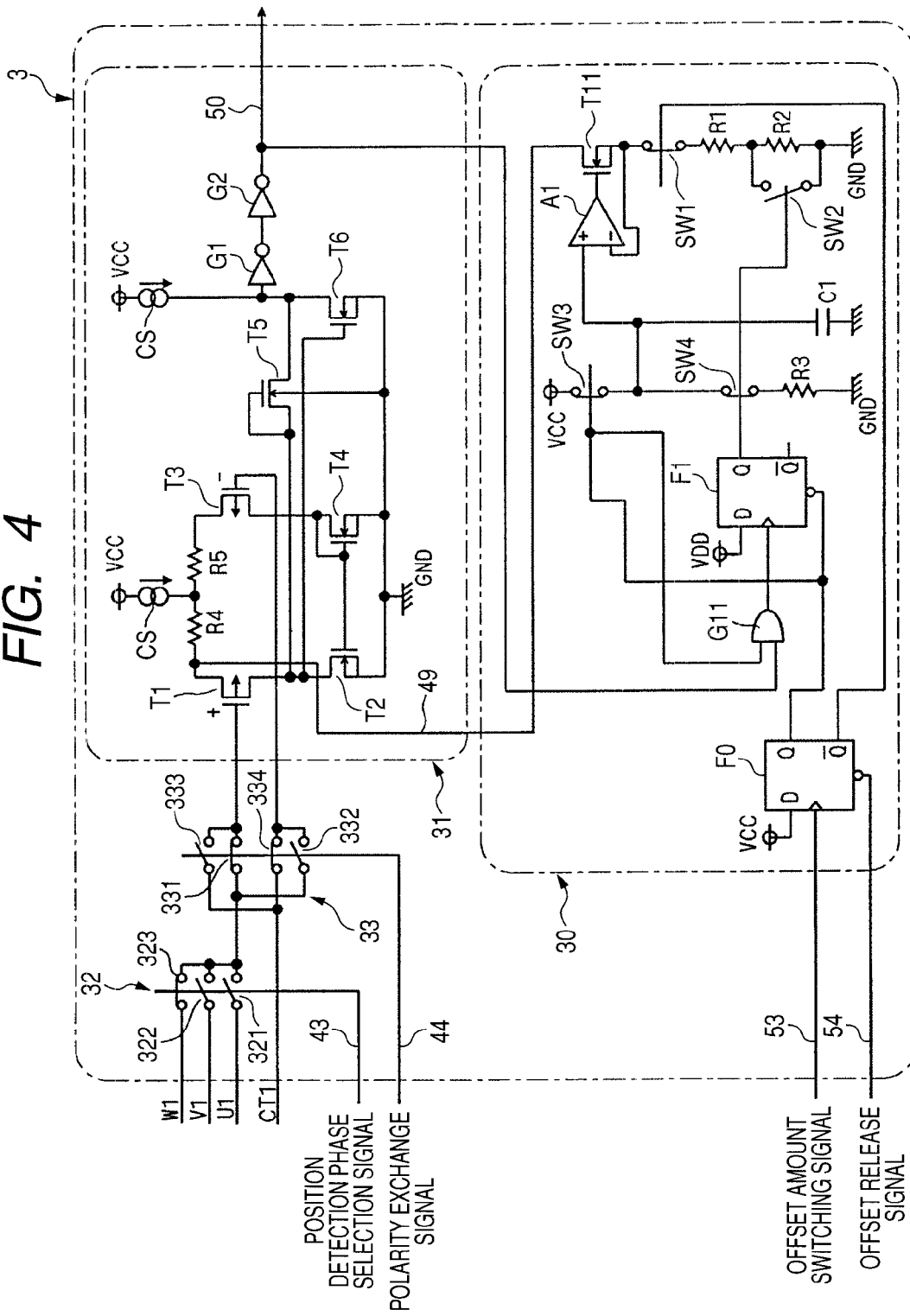
FIG. 4 is a diagram showing a configuration of a comparison circuit.

Since the N channel type MOS transistor T5 is coupled between the coupling nodes of the MOS transistors T1 and T2 and the drain of the MOS transistor T6 in the comparator 31 shown in FIG. 4, the MOS transistor T5 is turned on along with the MOS transistor T6. When the drain voltage of the MOS transistor T6 becomes equal to its gate voltage, the MOS transistor T6 is turned off to stop the flow of current therethrough. Therefore, the point p (zero cross point) is detected to bring the output of the comparator 31 to an "H" level.

Thereafter, the position detection circuit 8 detects that the output signal 50 of the comparator 31 has been brought to the "H" level. The offset amount switching signal 53 outputted from the sensorless operation circuit 9 is toggled to bring the inverse Q output of the flip-flop F0 to the "L" level so that the switch SW1 is brought to an on state, whereby an offset occurs in the detection of the comparator 31 and the output signal is held at the "L" level regardless of the fact that the corresponding B-EMF continues to be held in a high state.

Upon the detection of the point p, a portion corresponding to the beginning of the interval 3 in FIG. 6 is indicated by a black circle. Here, the B-EMF voltage W1 of the W phase is detected.

Next, in Step ST36, the MC counter 95 (FIG. 3) is reset to start the operation of counting a clock signal.

After the detection of the point p, the state of interruption of the current is maintained until an electrical angle of 7.5° elapses (Step ST37). In Step ST38 after the elapse of 7.5°, the drive current is passed to set the mask signal 52 (bring it to the "L" level in this case). The mask signal 52 is of a signal for eliminating an unconfirmed signal at the output signal 50 of the comparator 31.

Figure 3:
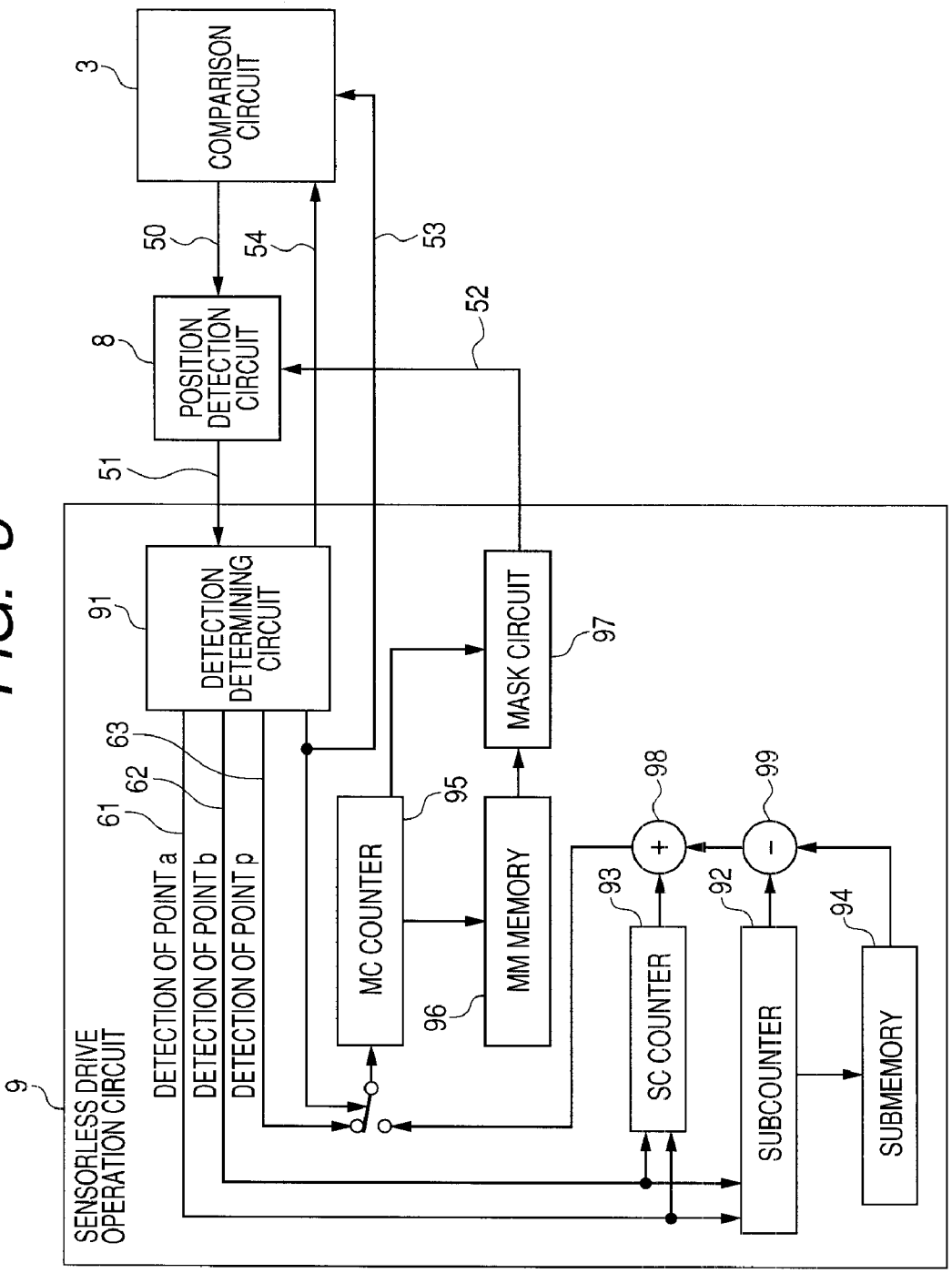
FIG. 3 is a block diagram depicting a configuration of a sensorless drive arithmetic circuit.

Thereafter, in Step ST39, the length of the previous length, i.e., the time required to perform detection from the point p of the interval 2 to the point p of the interval 3 is read from the MC counter 95 (FIG. 3) and stored in the MM memory 96 (FIG. 3). Namely, the data stored in the MM memory 96 is called MM2 during the interval 3. The data stored therein becomes a count value MC2 obtained by measuring the length (time) of the interval 2 by the MC counter 95. This is represented in the following manner when formulated:

MM(n−1)=MC(n−1), where n indicates an interval number and is an integer that begins from 1.

Here, the data stored in the MM memory 96 in Step ST39 is of data held in a temporary storage part lying within the MC counter 95 prior to its reset after the end of counting of the length of the interval 2. It can thus be said that the MC counter 95 is of a counter with a latch function. The MC counter 95 continues to count the length of the interval 3 and continues it up to the detection of a point p at the next interval 4. The result of its count is held in the temporary storage part as data about the length (time) of the interval 3 by resetting of Step ST36.

By repeating such an operation, the zero cross points (points p) at the respective intervals are detected and the sensorless drive operation circuit 9 outputs revolving signals FG using the detected zero cross points.

B-2. Detecting Operation at Interval 5

The operation of calculating each zero cross point according to the present invention will next be explained using the flowchart shown in FIG. 9, taking the intervals 5 through 7 in the equi-velocity area as an example. Incidentally, since the operations of Steps ST1 through ST6 in FIG. 9 are identical to those of Step ST31 through ST36 described using FIG. 8, their dual explanations will be omitted.

Simultaneously with the resetting of the MC counter 95 in Step ST6, the drive current is interrupted in Step ST7 and the mask signal 52 is released. Since, however, the drive current has already been interrupted and the mask signal 52 has been released according to Step ST2 during the interval 5, the state of interruption of the drive current is maintained and the state of release of the mask signal 52 is maintained.

Next, in Step ST8, the offset amount switching signal 53 is made significant to set an offset value by the offset control circuit 30. When the offset amount switching signal 53 becomes significant, the inverse Q output of the flip-flop F0 of the offset control circuit 30 is brought to an "L" level so that the switch SW1 is brought to an on state. It is thus possible to pull up the current (offset control current 49) from the comparator 31 via the resistors R1 and R2. An offset value set by pulling the current via the resistors R1 and R2 is referred to as "double (×1) offset (first offset value)".

Incidentally, when the inverse Q output of the flip-flop F0 becomes the "L" level, the Q output is brought to the "H" level so that the switch SW3 becomes an off state. The on state of the switch SW1 and the off state of the switch SW3 are maintained until the offset release signal 54 becomes significant.

Even if the switch SW3 is brought to the off state, the voltage is applied to the + terminal of the amplifier A1 by the electrical charge stored in the capacitor C1, so that a feedback operation is done by the gate of the MOS transistor T11 and the output of the amplifier A1. Thus, the − terminal of the amplifier A1 becomes the same voltage as the + terminal and the current flows through the MOS transistor T11. Since, at this time, the Q output of the flip-flop F1 is in an "L" state and the switch SW4 is in an on state, the electrical charge stored in the capacitor C1 flows into ground via the resistor R3, and the voltage applied to the + terminal of the amplifier A1 is attenuated by the time constant of the resistor R3 and the capacitor C1. With its attenuation, the current flowing through the resistor R4 (FIG. 4) of the comparator 31 is also attenuated and the offset amount is attenuated too.

This state is shown in the extracted diagram of FIG. 6 showing the relationship between the offset voltage of the comparator 31 and the B-EMF waveforms.

Since the corresponding B-EMF voltage is in an increasing state with respect to the attenuated offset voltage, there exists a point where the offset voltage and the B-EMF voltage become equal. The point where the two have coincided with each other is detected as a point a by the comparator 31. Incidentally, the detection of the point a is indicated by a black circle at a portion adjacent to a point p at the interval 5 in FIG. 6. Here, a B-EMF voltage V1 of the V phase is detected.

After the detection of the point p in Step ST7, the period taken until an electrical angle of 7.5° elapses is monitored (Step ST9). It is confirmed whether the point a has been detected during the period (Step ST10).

When the point a is not detected in Steps ST9 and ST10 even if the electrical angle of 7.50° has elapsed, the drive current is passed and the mask signal 52 is set in Step ST19 (it is brought to the "L" level in this case).

Thereafter, in Step ST20, the length of the previous interval, i.e., the time required to perform detection between the point p of the interval 4 and the point p of the interval 5 is read from the MC counter 95 (FIG. 3) and stored in the MM memory 96 (FIG. 3).

On the other hand, when the point a is detected before the electrical angle of 7.5° elapses in Steps ST9 and ST10, the SC counter 93 (FIG. 3) is reset to start the operation of counting a clock signal (Step ST11).

Incidentally, the resetting of the MC counter 95 is executed in matching with the timing at which the detection of the point a appears on the output signal 50 of the comparator 31 as a signal. Simultaneously with it, the amount of offset of the offset control circuit 30 is changed (Step ST12).

That is, when the point a is detected and the output signal 50 of the comparator 31 is raised to an "H" state, the Q output of the flip-flop F1 is brought to an "H" state, so that the switch SW4 is brought to an off state and the switch SW2 is brought to an on state. Thus, the pulling of current from the comparator 31 is performed via the resistor R1, whereby the value of the current pulled out by a reduction in the resistance value increases. When the resistance values of the resistors R1 and R2 are set identical to each other here, the amount of current becomes twice and hence the offset amount of the comparator 31 becomes twice. Accordingly, the offset value set by pulling the current via the resistor R1 is referred to as a twice (×2) offset (second offset value). Incidentally, the on state of the switch SW2 and the off state of the switch SW4 are maintained until the offset release signal 54 becomes significant.

A point at which the offset voltage and the corresponding B-EMF voltage become equal with respect to the set double offset voltage, is detected as a point b by the comparator 31. The interval 5 shown in FIG. 6 indicates the case in which the point b is not detected. A portion adjacent to the point a of the interval 5 is indicated by an open or outline circle in FIG. 6.

After the detection of the point p in Step ST7, the period taken up to the elapse of the electrical angle of 7.5 is monitored continuously (Step ST13). It is confirmed whether the point b is detected during that period (Step ST14).

When the point b is not detected in Steps ST13 and ST14 even if the electrical angle of 7.5° has elapsed, the drive current is passed and the mask signal 52 is set in Step ST19 (it is brought to the "L" level in this case).

Thereafter, in Step ST20, the length of the previous interval, i.e., the time required to perform detection between the point p of the interval 4 and the point p of the interval 5 is read from the MC counter 95 (FIG. 3) and stored in the MM memory 96 (FIG. 3).

Since the point b is not detected during the interval 5 here, the data MM4 stored in the MM memory 96 is a count value MC4 obtained by measuring the length (time) of the interval 4 by the MC counter 95. Next, the operations subsequent to Step ST2 are repeated to detect a point p at the interval 6.

B-3. Detecting Operation of Interval 6

The interval 6 corresponds to a section or interval between an interval to which the operation of calculating the zero cross point according to the present invention is applied, and an interval (interval to which the operation of calculating each zero cross point according to the present invention cannot be applied) to which the conventional detecting operation is applied. The point p is detected by the conventional detecting operation and points a and b are detected, thereby calculating the corresponding zero cross point at the next interval 7.

Thus, the interval 6 lies between the intervals 5 and 7 and is of an interval necessary prior to the operation of calculating the zero cross point according to the present invention. The provision of Steps ST2 through ST5 similar to the conventional detecting operation is adaptable to such an interval.

Even in the case of the interval 6 shown in FIG. 6, the operations of Steps ST2 through ST14 are repeated. Since, however, the point b is detected during the interval 6, the detecting operation proceeds to Step ST15.

Step ST15 is a process for storing the values counted by the SC counter 93 and the MC counter 95. A count value operated or computed based on the following operational expression is stored in the MM memory 96:

$MM(n-1)=\beta \times MC(n-1)+\alpha\{SC(n-1)+t(n-1)-t(n)\}$, where n indicates an interval number and is an integer that begins from 1.

Since the coefficients $\alpha$ and $\beta$ are respectively set to 0 and 1 in Step ST4, the above operational expression is brought to $MM(n-1)=MC(n-1)$ and thereby becomes the same as the operation in Step ST20.

Namely, the data stored in the MM memory 95 is referred to as MM5 during the interval 6. The data stored therein is a count value MC5 obtained by measuring the length (time) of the interval 5 by the MC counter 95.

After the storage of the data in the MM memory 96, the drive current is passed and the mask signal 52 is set in Step ST16 (it is brought to an "L" level in this case).

Next, it is determined in Step ST17 whether the count value of the SC counter 93 having started counting in Step ST11 reaches a value $(SC(n)=MM(n-1)-t(n))$ obtained by subtracting a count value equivalent to the time $t(n)$ from the count value $(MC(n-1))$ stored in the MM memory 96.

Here, the time $t(n)$ corresponds to the time represented as t6 during the interval 6. The time t6 will be further explained using FIG. 7.

FIG. 7 shows, in enlarged form, an extracted diagram showing the relationship between the offset voltage and the B-EMF waveform at the interval 6. The vertical axis indicates the voltage (v) and the horizontal axis indicates the time (t). In FIG. 7, the detected points p, a and b are shown and the time taken between the point a and b corresponds to t6. Since the count of the SC counter 93 is started at the time t6 in Step ST11 after the detection of the point a, the time (count number) up to the detection of the point b can be acquired.

Incidentally, the time from the points p to a can be handled as a predicted time approximately equal to the time t6 corresponding to an actual detection time with respect to the time t6. Namely, since the offset voltage v1 that detects the point b is equal to twice the offset voltage v1 that detects the point a, a proportional relation is extrapolated, thereby making it possible to treat the time from the points p to a as the predicted time approximately equal to the time t6. This is the same even in the case of the intervals 7 through 12. Here, it is an important factor in the present invention that the time between the points p and a is treated as the predicted time approximately equal to the time t6.

Applying the above operational expression to the period or interval 6 yields SC6=MM5–t6. Since MM5=MC5 as mentioned above, SC6 is equal to MC5–t6(SC6=MC5–t6).

This operational expression means that when the count value of the SC counter 93 is a value obtained by subtracting the count value corresponding to the time t6 from the count value at the interval 5 stored in the MM memory 96 after the detection of the point a at the interval 6, the count value of the SC counter 93 has reached a point p of the interval 7 (it has passed the point p). It means that the position of the point p has been calculated by prediction without being actually measured. Incidentally, even after the calculation of the point p, the SC counter 93 continues counting till the detection of a point at the interval 7.

After the position of the point p at the interval 7 has been calculated in Step ST17, the detecting operation proceeds to Step ST18, where coefficients $\alpha$ and $\beta$ are set to 1 and 0 respectively. This operation means that a predicting mode (p-point prediction mode) has been reached due to the calculation of the position of the point p. Incidentally, Step ST17 is repeated until the position of the point p can be detected.

B-4. Calculating Operation at Interval 7

Since the p-point prediction mode is reached during the interval 7 shown in FIG. 6, the operations of Steps ST6 through ST18 are repeated. Since $\alpha$ and $\beta$ are respectively equal to 1 and 0 in Step ST15 although the operations up to Step ST14 are similar to the operation at the interval 6, the operational expression of $MM(n-1)=\beta \times MC(n-1)+\alpha\{SC(n-1)+t(n-1)-t(n)\}$ becomes $MM(n-1)=SC(n-1)+t(n-1)-t(n)$.

Thus, the above operational expression becomes MM6=SC6+t6–t7 during the interval 7. Namely, the data stored in the MM memory 96 is called MM6 during the interval 7. The data stored therein reaches a count value obtained by adding the count value corresponding to the time t6 measured during the interval 6 to SC6 corresponding to the count value of the SC counter 93 that has started counting after the detection of the point a at the interval 6 and continued counting until the point a is detected during the interval 7, and subtracting a count value corresponding to the time t7 measured during the interval 7 from the result of addition.

This operational expression means that the count value t6 (approximately identical to the time from the points p to a) is added to the count value SC6 to bring the count value SC6 to substantially the same value as where the count is started from the point p at the interval 6, and the count value t7 (approximately identical to the time from the points p to a) is subtracted therefrom to bring the count value SC6 to substantially the same value as where the count is ended at the position of the point p at the interval 7. Thus, MM6 finally represents the time from the point p at the interval 6 to the position of the point p at the interval 7, i.e., the length of the interval 6.

After the storage of the data in the MM memory 96, the drive current is passed and the mask signal 52 is set in Step ST16 (it is brought to an "L" level in this case).

Next, it is determined in Step ST17 whether the count value of the SC counter 93 having started counting in Step ST11 reaches a value (SC(n)=MM(n−1)−t(n)) obtained by subtracting a count value equivalent to the time t(n) from the count value (MC(n−1)) stored in the MM memory 96.

SC7=MM6−t7 if the above operational expression is applied to the period or interval 7. Since, however, MM6=SC6+t6−t7 as mentioned in this case, SC7 becomes SC7=SC6+t6−2t7 and the count value of the SC counter 93 reaches this count value, thereby reaching the position of a point p at the interval 8, whereby the position of the point p can be calculated by prediction without being actually measured. Incidentally, the SC counter 93 continues counting until the detection of the point a at the interval 8 even after the calculation of the point p.

In Step ST17, after the position of the point p at the interval 8 has been calculated, the detecting operation proceeds to Step ST18, where coefficients α and β are respectively set to 1 and 0.

Incidentally, the position of the point p is calculated by the above operation during the interval 8 thereby to interrupt the drive current (Step ST7), and the point b is detected in Step ST14 thereby to pass the drive current (Step ST16). Therefore, the current is substantially interrupted only between the calculation of the point p and the detection of the point b. This period or interval is about 3° as an electrical angle in the equi-velocity area. The interruption period of the drive current can be reduced significantly as compared with the case in which it is necessary to interrupt the current at 26.25° before the detection of the point p, and interrupt the current even after the detection of the point p as in the conventional case.

B-5. Calculating Operation at Interval 10

A calculating operation at the interval 10 corresponding to the acceleration area will next be explained. While the count operation of the SC counter 93, which has been started after the detection of the point a at the interval 9, becomes longer than the count operation in the equi-velocity area as a result of acceleration at the interval 10, the operation of calculating a point p at the interval 11 is the same as the operation in the equi-velocity area.

Namely, the count operation of the SC counter 93, which has been started after the detection of the point a at the interval 9, is reset and the amount of offset is se to twice (Step ST12). Thereafter, the operations of Steps ST13 and ST14 are repeated until the point b is detected.

As shown in FIG. 6, the time taken from the detection of the point a to the detection of the point b reaches t10 and MM9 becomes MM9=SC9+t9−t10 in Step ST15.

After the drive current has been passed in Step ST16, it is determined in Step ST17 whether the count value of the SC counter 93 having started counting in Step ST11 reaches a value (SC10=MM9−t10) obtained by subtracting a count value corresponding to the time t10 from the count value MC9 stored in the MM memory 96.

Since MM9=SC9+t9−t10 as mentioned in this case, SC10 becomes SC10=SC9+t9−2t10 and the count value of the SC counter 93 reaches this count value, thereby resulting in achievement to the position of the point p at the interval 11, whereby the position of the point p can be calculated by prediction without being actually measured. Incidentally, the SC counter 93 continues counting until the detection of the point a at the interval 11 even after the calculation of the point p.

Thus, since the point p can be calculated without interrupting the drive current over a long period of time in a manner similar to the equi-velocity area even in the case of the acceleration area, it is possible to reduce noise caused by distortion of each waveform with the interruption of the drive current along with the stable position detection.

Incidentally, the time taken from the calculation of the point p to the detection of the point a and the time taken from the detection of the point a to the detection of the point b become long as the result of acceleration as shown in the interval 10 of FIG. 6. When, however, these times exceed an electrical angle of 7.5°, the p-point prediction mode is released in Steps ST9 and ST13 and the mode is returned to the conventional mode. Although it is shown in FIG. 6 such that the conventional mode is reached during the interval subsequent to the interval 13 and the point p is detected, this is merely illustrated by way of example.

B-6. Timing Chart

Figure 10:
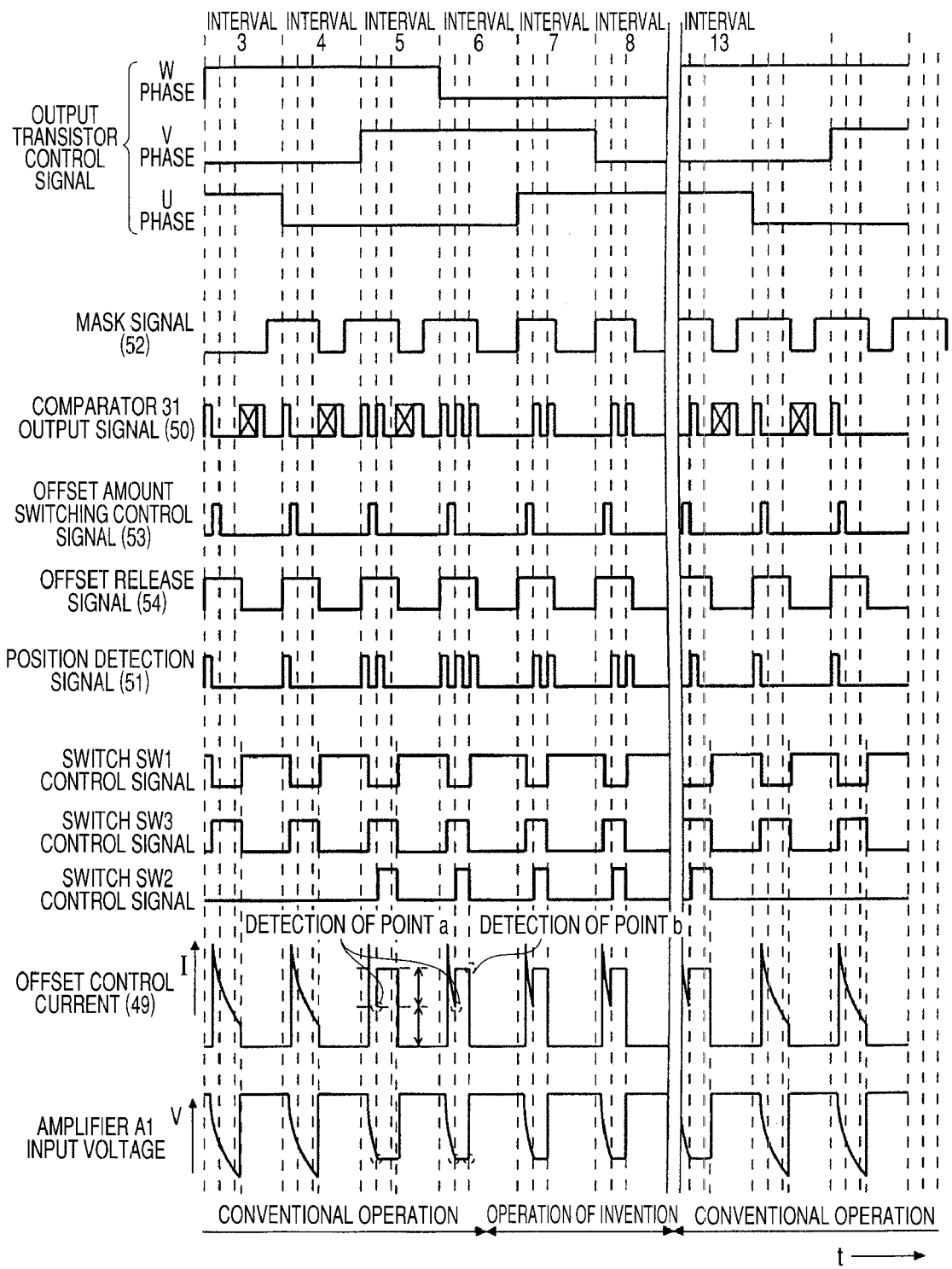
FIG. 10 is a timing chart showing the operation of the motor drive apparatus according to the present invention.

A timing chart showing the operation of the motor drive apparatus 100 described above is shown in FIG. 10. In FIG. 10, the waveforms indicative of control signals of output transistors are shown in order of W, V and U phases from above, the mask signal 52, output signal 50 of comparator 31, offset amount switching signal 53, offset release signal 54, position detection signal 51, control signal of switch SW1, control signal of switch SW3 and control signal of switch SW2 are shown in order, and the waveform of the offset control current 49 and the voltage inputted to the + terminal of the amplifier A1 are further shown together.

Figure 8:
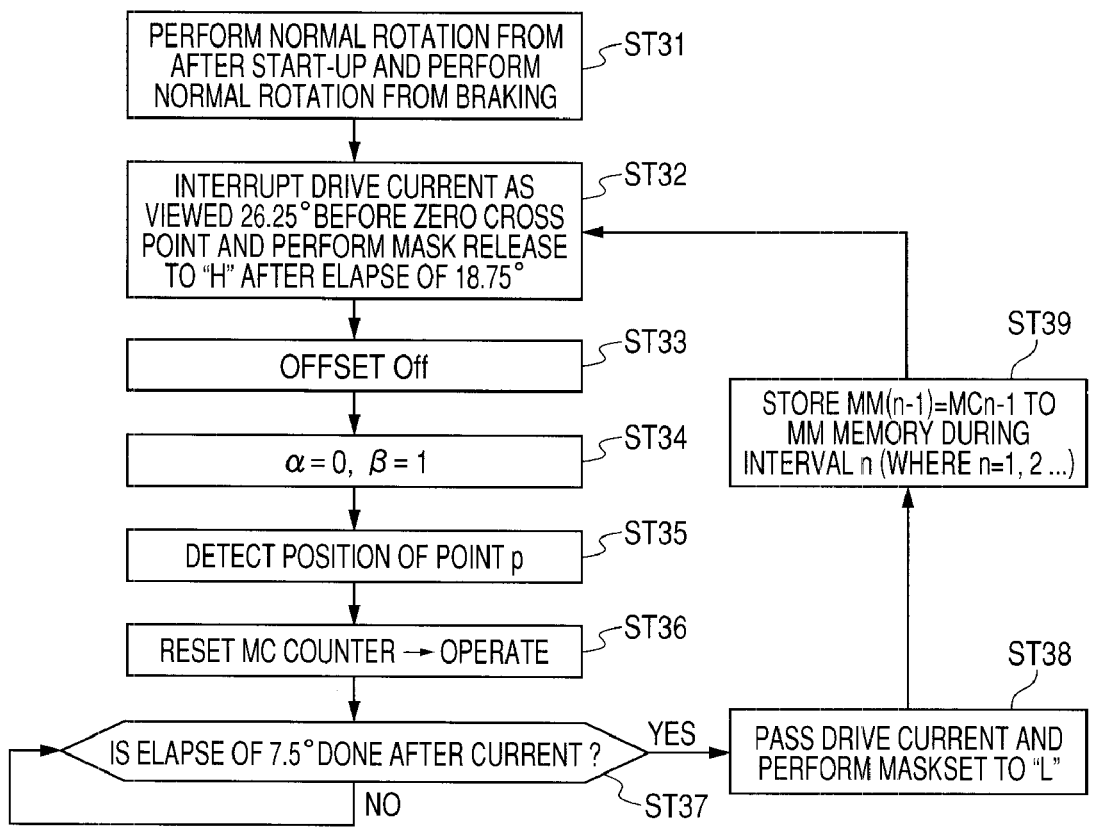
FIG. 8 is a flowchart for describing the operation of detecting a zero cross point by a conventional method.

Since the operations shown in the timing chart have been basically described in the descriptions of the flowcharts shown in FIGS. 8 and 9, dual explanations are omitted. It is however understood that since the offset amount of the comparator 31 is set twice after the detection of the point a subsequent to the interval 5 as indicated by the waveform of the offset control current 49, the offset control current 49 is doubled.

C. Advantageous Effects

In the motor drive apparatus 100 as described above, the points a and b subsequent to the point p are measured under the interruption of each drive current without actually measuring the zero cross point (point p) of the drive current, and the point p at the next interval is calculated (predicted) based on the result of measurement. Therefore, the interruption period of the drive current can be reduced greatly as compared with the conventional method in which the current is interrupted from before the electrical angle of 26.25° prior to the detection of the point p and the current is interrupted even after the detection of the point p. This is similar even in the case of the equi-velocity area and the acceleration area. Since it is not necessary to interrupt the drive current over a long period of time, it is possible to perform a stable position detection and reduce noise caused by distortion of each waveform with the interruption of the drive current.

Figure 11:
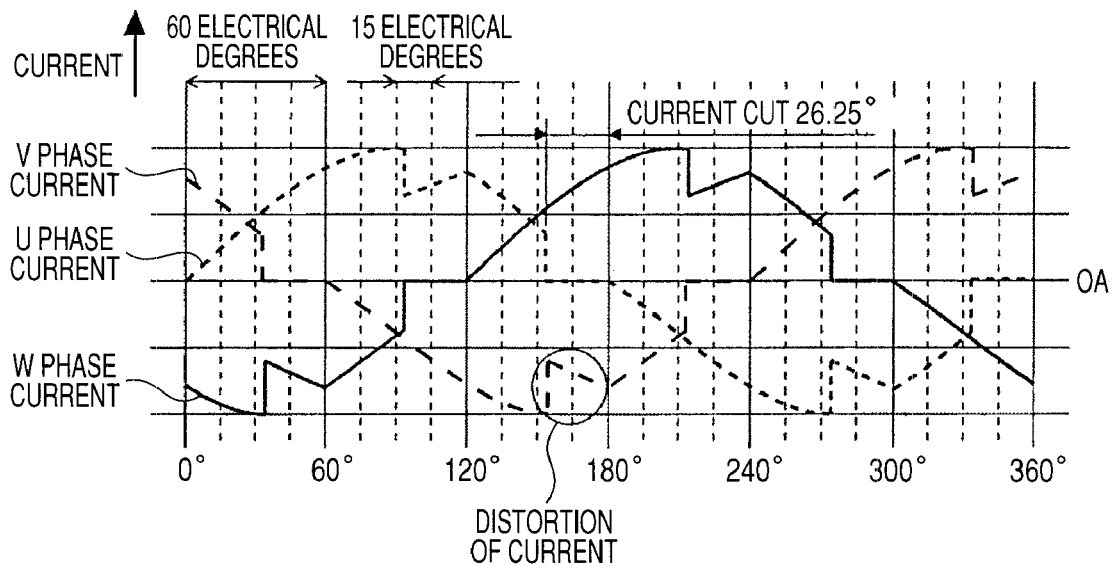
FIG. 11 is a diagram illustrating waveforms of drive currents for respective phases where a conventional zero cross point detecting method is adopted.
Figure 12:
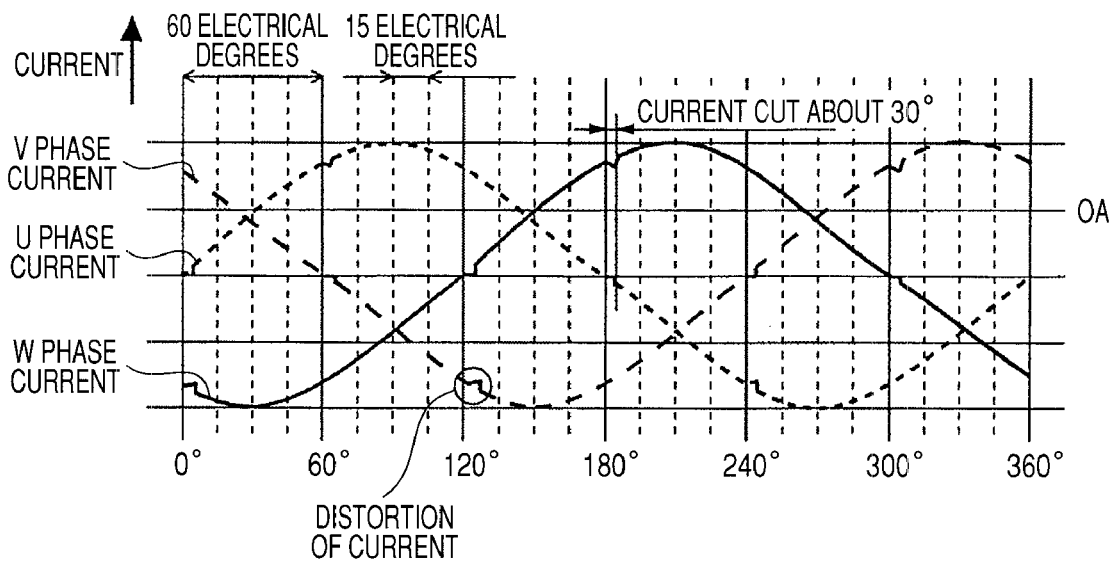
FIG. 12 is a diagram showing waveforms of drive currents for respective phases where a zero cross point calculating method employed in the motor drive apparatus according to the present invention is adopted.

Now, FIG. 11 shows waveforms of drive currents of respective phases where a conventional p-point detecting method is adopted. FIG. 12 shows waveforms of drive currents of respective phases where a p-point predicting method is adopted.

It is understood that when current interruption is done at a given phase as shown in FIG. 11, portions corresponding to phases shifted by 120° in electrical angle are greatly distorted corresponding to current interruption. This becomes pronounced as the current interruption period or interval becomes long. On the other hand, since each current is interrupted to detect the points a and b in each waveform shown in FIG. 12 after acquisition of the zero cross point (point p) of each drive current by calculation, its interruption period may be 3° or so as an electrical angle. It is therefore understood that distortion at each of the portions corresponding to the phases shifted by 120° in electrical angle is also slight.

D. First Modification

Figure 13:
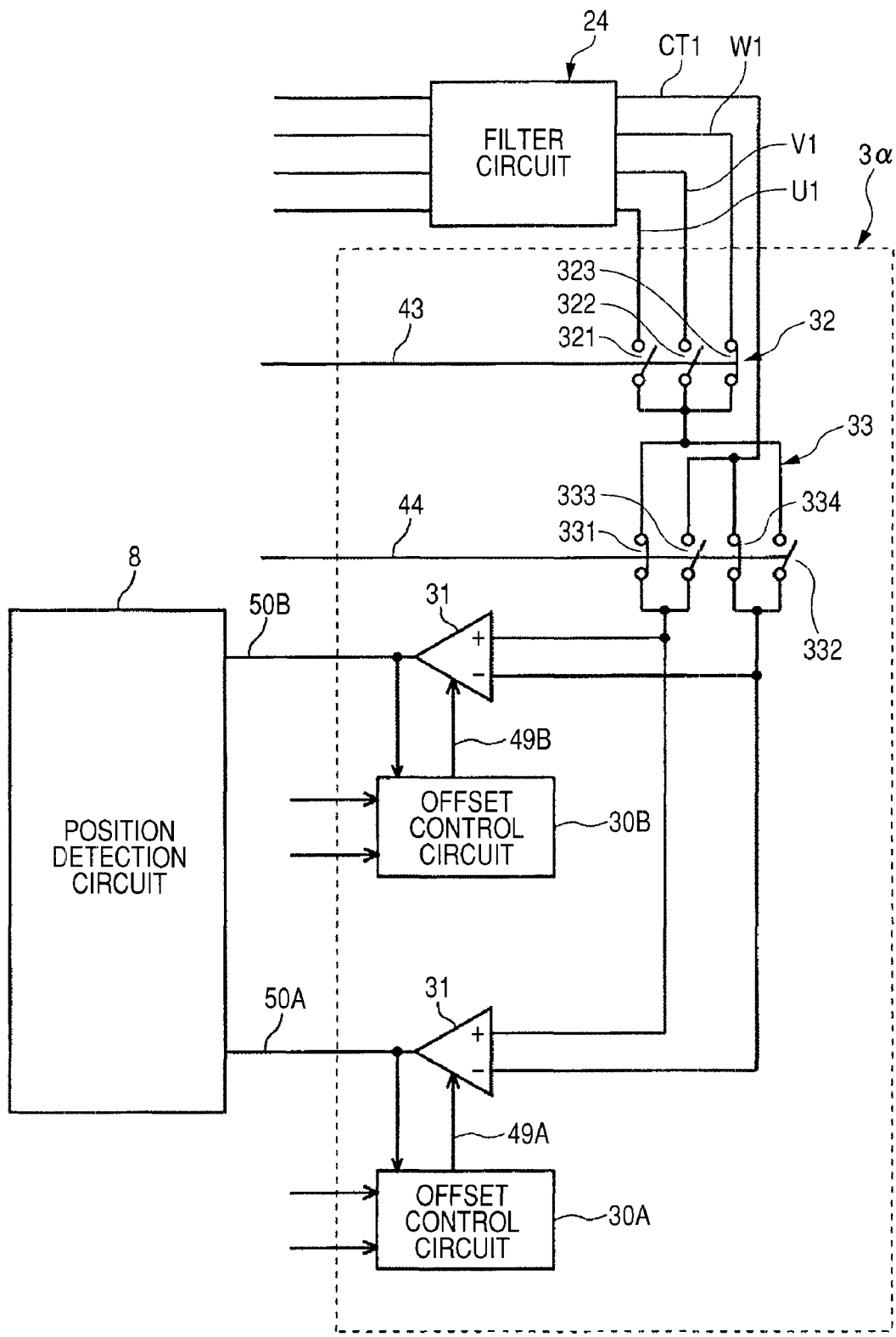
FIG. 13 is a diagram depicting a configuration of a modification 1 of the embodiment according to the present invention.

Although the motor drive apparatus 100 has such a configuration that as described using FIGS. 1 and 4, the comparison circuit 3 has the comparator 31 and the offset control circuit 30, and the offset control circuit 30 changes the offset control current 49 in the form of two stages thereby to make it possible to set the two offset values, the motor drive apparatus may be set to such a configuration that it has offset control circuits 30A and 30B different in offset value and two comparators 31 respectively controlled by the offset control circuits 30A and 30B as in a comparison circuit 3α shown in FIG. 13. Incidentally, the same reference numerals are respectively attached to the same components as those of the comparison circuit 3 described in FIGS. 1 and 4, and their dual explanations are omitted.

In this case, the comparator 31 controlled by the offset control circuit 30A is set to an offset value for detecting a point a by an offset control current 49A and outputs an output signal 50A. The comparator 31 controlled by the offset control circuit 30B is set to an offset value for detecting a point b by an offset control current 49B and outputs an output signal 50B. In this case, the offset control current 49B becomes twice the offset control current 49A.

Adopting such a configuration makes it possible to simplify the configurations of the offset control circuits 30A and 30B.

Incidentally, as the configuration of the offset control circuit 30A, such a configuration that it has the resistors R1 and R2 of the offset control circuit 30 and does not include the switch SW2 may be adopted. As the configuration of the offset control circuit 30B, such a configuration that it does not include the resistor R2 and the switch SW2 may be adopted.

E. Second Modification

Figure 14:
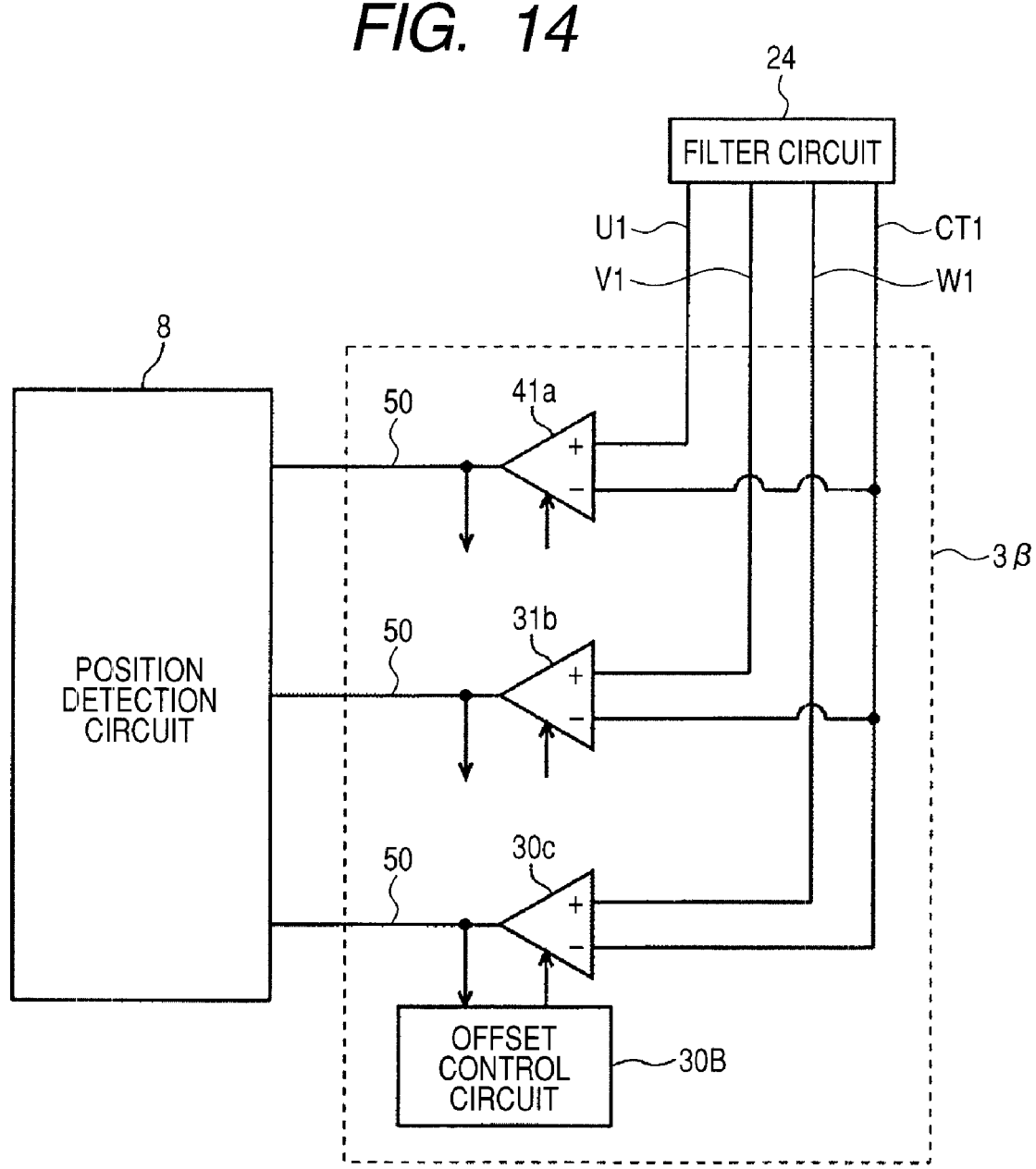
FIG. 14 is a diagram showing a configuration of a modification 2 of the embodiment according to the present invention.

The motor drive apparatus 100 has such a configuration that as described using FIGS. 1 and 4, the comparison circuit 3 has one comparator 31 and one offset control circuit 30 and includes the signal switching unit 32 and the polarity switching unit 33 to supply the B-EMF voltages of the respective phases to the comparator 31 individually. However, as in a comparison circuit 3β shown in FIG. 14, such a configuration that comparators 31a, 31b and 31c respectively inputted with B-EMF voltages U1, V1 and W1 are provided, and the comparators 31a through 31c are controlled from an offset control circuit 30B, may be adopted. Incidentally, the same reference numerals are respectively attached to the same components as those of the comparison circuit 3 described in FIGS. 1 and 4, and their dual explanations are omitted.

In this case, the offset control circuit 30B has such a configuration as to switch control to the comparators 31a, 31b and 31c at timings provided to supply the currents of the respective phases.

With the adoption of such a configuration, the signal switching unit 32 and the polarity switching unit 33 become unnecessary and hence the comparison circuit 3β becomes simple in configuration.

F. Third Modification

Figure 15:
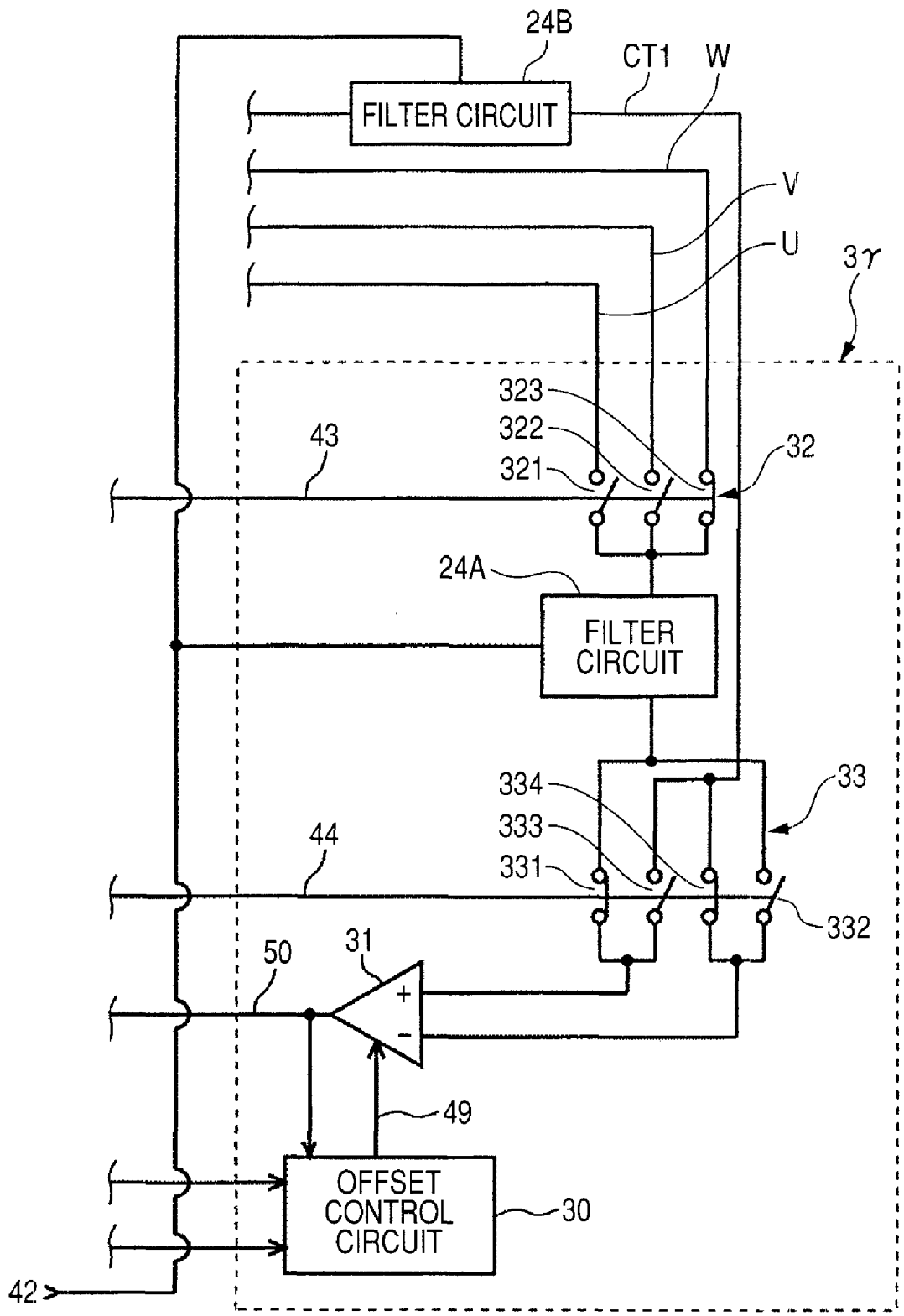
FIG. 15 is a diagram illustrating a configuration of a modification 3 of the embodiment according to the present invention.

The motor drive apparatus 100 has such a configuration that as described using FIG. 1, the filer circuit 24 is coupled to the coil terminals TU, TV and TW of the 3-phase brushless motor 21 and the neutral point terminal TN thereof, the signal switching unit 32 is supplied with the post-filtering back electromotive voltages U1, V1 and W1 and the polarity switching unit 33 is supplied with the post-filtering neutral point voltage CT1. However, such a configuration that a signal switching unit 32 is directly supplied with back electromotive voltages U, V and W and a filter circuit 24A for filtering one signal selected by the signal switching unit 32 is provided as in a comparison circuit 3γ shown in FIG. 15, may be adopted. In this case, a filter circuit 24B about a neutral point voltage CT may be provided outside the comparison circuit 3γ or may be provided thereinside. Incidentally, the same reference numerals are respectively attached to the same components as those of the comparison circuit 3 described using FIGS. 1 and 4, and their dual explanations are omitted.

Adopting such a configuration makes it unnecessary to provide the filter circuits for every phase and enables simplification of the apparatus configuration.

What is claimed is:

1. A motor drive apparatus for driving a 3-phase brushless motor without using a Hall sensor, comprising:
    a voltage comparison unit having a comparator which compares each of voltages of coil terminals of three phases with a voltage of a neutral point of 3-phase coils to determine which voltage is higher or lower; and
    a drive operation unit which calculates, based on a signal outputted from the voltage comparison unit, a zero cross point of a voltage of a position detection phase, of the voltages of the coil terminals of the respective phases by operation, and interrupts a current of the position detection phase by a first time from the zero cross point,
    wherein one interval is defined between the zero cross points at the phases for the coil terminal voltages, and
    wherein the drive operation unit performs the operation using time information measured based on the output signal from the voltage comparison unit at a previous interval and a present interval, and calculates the zero cross point at a next interval using the result of operation.

2. The motor drive apparatus according to claim 1, wherein when the zero cross point at the present interval is uncalculable by the operation based on the output signal from the voltage comparison unit at the previous interval, the drive operation unit interrupts the current of the position detection phase before a second time from the zero cross point predicted and detects the zero cross point by the comparator during an interruption period thereof, thereby acquiring the zero cross point at the present interval.

3. The motor drive apparatus according to claim 2,
    wherein the voltage comparison unit has an offset control circuit capable of setting first and second offset values to the comparator,
    wherein the comparator detects a first voltage of the position detection phase at a first detection point spaced away from the zero cross point when the first offset value is set, detects a second voltage of the position detection phase at a second detection point spaced away from the first detection point when the second offset value is set, and makes the output signal significant at a first timing provided to detect the first voltage and a second timing provided to detect the second voltage, to output the same therefrom, wherein the drive operation unit has:
- a first counter which starts the measurement of a time from after the output signal has been made significant at the first timing at the present interval and continues the measurement until the output signal becomes significant at the first timing at the next interval; and
- a subcounter which measures an actual detection time until the output signal becomes significant at the second timing after the output signal has been made significant at the first timing, wherein a total count value of the first counter measured at the previous interval and the actual detection time measured at the previous interval are defined as the time information at the previous interval, wherein the actual detection time measured at the present interval is defined as the time information at the present interval, and wherein a point in time when a count value of the first counter being measured at the present interval becomes equal to the result of operation, is calculated as the zero cross point at the next interval.

4. The motor drive apparatus according to claim 3, wherein the drive operation unit treats a time taken until the output signal becomes significant at the first timing from the zero cross point as a prediction time equal to the actual detection time, and uses, as the result of operation, one obtained by further subtracting a count value corresponding to the actual detection time measured at the present interval from a post-operation count value obtained by adding a count value corresponding to the actual detection time measured at the previous interval to the total count value of the first counter measured at the previous interval and subtracting the count value corresponding to the actual detection time measured at the present interval therefrom.

5. The motor drive apparatus according to claim 3, wherein the drive operation unit controls the offset control circuit after the detection of the zero cross point or after the calculation of the zero cross point, to set the first offset value to the comparator, controls the offset control circuit after the output signal has been made significant at the first timing, to set the second offset value to the comparator, and performs the operation after the output signal has been made significant at the second timing.

6. The motor drive apparatus according to claim 3, wherein the drive operation unit has a second counter which starts the measurement of a time from after the detection of the zero cross point or the calculation of the zero cross point and continues measuring until the zero cross point at the next interval is detected or until the zero cross point thereat is calculated, and wherein, when the zero cross point at the present interval is uncalculable by the operation based on the output signal from the voltage comparison unit at a previous interval, the drive operation unit uses, as the result of operation, one obtained by subtracting the count value corresponding to the actual detection time measured at the present interval from a total count value of the second counter.

7. The motor drive apparatus according to claim 3, wherein the second offset value is set to twice the first offset value.

* * * * *